(12) United States Patent
Tarabula

(10) Patent No.: US 6,607,291 B2
(45) Date of Patent: Aug. 19, 2003

(54) FLASH TUBE FILTER DEVICE

(75) Inventor: Michael A. Tarabula, Chamblee, GA (US)

(73) Assignee: The Christmas Light Company Inc., Mesa, AZ (US)

( * ) Notice: Subject to any disclaimer, the term of this patent is extended or adjusted under 35 U.S.C. 154(b) by 0 days.

(21) Appl. No.: 10/026,987

(22) Filed: Dec. 18, 2001

(65) Prior Publication Data

US 2003/0112628 A1 Jun. 19, 2003

(51) Int. Cl.$^7$ ................................................ F21V 5/00
(52) U.S. Cl. ............................ 362/317; 362/3; 362/8; 362/12; 362/11; 362/16; 362/236; 362/293; 362/351
(58) Field of Search ................................ 362/317, 351, 362/293, 11, 12, 16, 3, 8, 356, 235, 236, 240

(56) References Cited

U.S. PATENT DOCUMENTS

| | | | |
|---|---|---|---|
| 904,362 A | 11/1908 | Robbins | |
| 1,102,022 A | 6/1914 | Edmunds | |
| 1,967,140 A | 7/1934 | Ainslie | 240/48.6 |
| 2,326,004 A | 8/1943 | Barrett | 240/1.3 |
| 3,148,835 A | 9/1964 | Horelick | 240/46.51 |
| 4,187,531 A | 2/1980 | Lowell et al. | 362/17 |
| 4,412,276 A | * 10/1983 | Blinow | 362/278 |
| 4,446,506 A | 5/1984 | Larson | 362/17 |
| 4,754,197 A | 6/1988 | Zwald | 315/57 |
| 4,847,645 A | * 7/1989 | Kallenberg et al. | 396/3 |
| 5,432,683 A | 7/1995 | Brown | 362/16 |
| 5,722,755 A | * 3/1998 | Slape | 362/11 |
| 6,010,234 A | 1/2000 | Rahn | 362/320 |

* cited by examiner

Primary Examiner—Sandra O'Shea
Assistant Examiner—Bertrand Zeade
(74) Attorney, Agent, or Firm—The Halvorson Law Firm

(57) ABSTRACT

Described is a filter device for reducing the light output of a flash tube, while leaving the light output of a modeling light tube unaffected, in a dual lamp photo strobe unit. The filter device is comprised of a body that is sized to fit over a flash tube in a dual light, photo strobe unit. Critically, the body fits over the flash tube only, thereby leaving the modeling light unobstructed. It its preferred embodiment, the filter device has axial symmetry. It a most preferred embodiment, the filter device has a circularly shaped base, a tubular sidewall that extends from the base to an enclosing top section. The top section critically includes an aperture through which the modeling light will project, when the filter device is placed upon a photo strobe unit.

7 Claims, 3 Drawing Sheets

FLASH TUBE FILTER DEVICE

FIELD OF THE INVENTION

The present invention relates to a device for reducing the mount of light output by a flash or strobe tube without affecting the light output from an attached modeling light.

BACKGROUND

A typical photo strobe unit consists of a power pack unit and a strobe or flash head. The flash head has two separate and different lighting sources, a modeling light and a flash tube. The modeling light, typically is a tungsten lamp, provides light used to simulate the light output from the flash tube, to light the subject for focusing, and to be the general light used for setup and styling or arrangement of the subject to be photographed. The flash tube, when fired, provides the actual light that exposes the film or digital image sensor.

The amount of light output from the flash tube is controlled by various settings on the power pack unit. Since a photo situation may require multiple lights at different output amounts or at different distances, typical power pack units have multiple settings ranging from low the high output. However, there are situations where the light required to be close to the subject for an effect, style, or certain "look" commonly requires great reduction in the flash output well below the lowest output setting of the power unit. Thus, there is a recognized need for methods and devices to further reduce or control the output of photo strobe units.

Known methods for reducing flash head output or-light to film/sensor include the following:

Bleeder heads. The power unit typically contains "banks" of discharge capacitors that supply power to the flash tube. The different power settings of the power unit control the number or amount of capacitors to be discharged. Also, a typical power unit will have more than one receptacle or output plug for each "bank" of capacitors. By varying the power settings and use of receptacles, various different power outputs may be achieved. For example, a "bank" or power unit having four output receptacles will provide 100% of the preselected power output to the flash tube when only one flash head is connected. When two flash heads are connected to the same "bank", the output would be 50% power to each flash head. By connecting four flash heads to the same "bank" the output to each flash head would be 25% power to each flash head. To use one flash head at 25% power requires three additional flash heads connected in order to "bleed" out the other power of that "bank " only. This method requires the "bleeder heads" to be isolated in order to prevent their undesirable light output from affecting the desired subject lighting. With this method a situation requiring three lights at 25% power would require a total of twelve flash heads in which nine flash heads used as "bleeder" heads and must be isolated so not to adversely affect the subject lighting. While this method does work to reduce light output, it is clearly not the best solution, especially if non-integral amounts of light are desired.

Neutral Density or ND filters over flash head. This method requires neutral density filter to be placed over the flash head. This is not always practicable since the ND filter needs to be placed away from the modeling light due to the high temperature of the light. Because of this need for distance from the flash tube, this method reduces light output from both the flash tube and modeling light. As the modeling light output is reduced, the ability to see the direction, style, and various qualities of the anticipated flash tube illumination is diminished.

ND filter over lens. A neutral density filter may be placed over the camera lens. This method makes focusing and general viewing difficult and does not work if all light outputs are not to be reduced by the same amount of reduction given by the ND filter. Further, the removing and replacing of the filter every time, in order to check focus, light and position, makes this method less desirable due to the general hassle and chance of forgetting to reinstall filter before making an exposure.

Increase distance from light to subject. This distance between the light and the subject may be increased. By increasing distance of the subject to the light there is a general loss of control, general viewing and accurate focus conditions.

Thus it can be seen that there is an existing and continuing need for devices that allow the easy reduction of light output from a flash tube, while leaving the modeling light output unaffected.

SUMMARY OF THE INVENTION

The present invention relates to a filter device for reducing the light output of a flash tube, while leaving the light output of a modeling light tube unaffected, in a dual lamp photo strobe unit. Therefore:

It is an object of the present invention to provide a filter device that fits over a flash tube of a dual light photo strobe unit, said device allowing a modeling light tube to project from the device thereby leaving the light output of the modeling light tube unaffected.

It is another object of the present invention wherein said filter is comprised of a mesh like material that allows a reduction in the amount of light provided by the flash tube.

It is a further object of the present invention wherein said mesh-like material is a metallic material that does not melt at temperatures created by flash tube use.

It is yet another object of the present invention to provide a series of differently sized filters that may be nestled within each other in order to provide a controllable reduction in the amount of light provided by the flash tube, while leaving the output of the modeling light unaffected.

It is still yet a further object of the present invention to provide a variety of different shaped filters that will conform with the different shapes and models of photo strobe units.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. § 112, paragraph 6 to define the invention. To the contrary, if the provisions of 35 U.S.C. § 112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. § 112, paragraph 6. Moreover, even if the provisions of 35 U.S.C. § 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
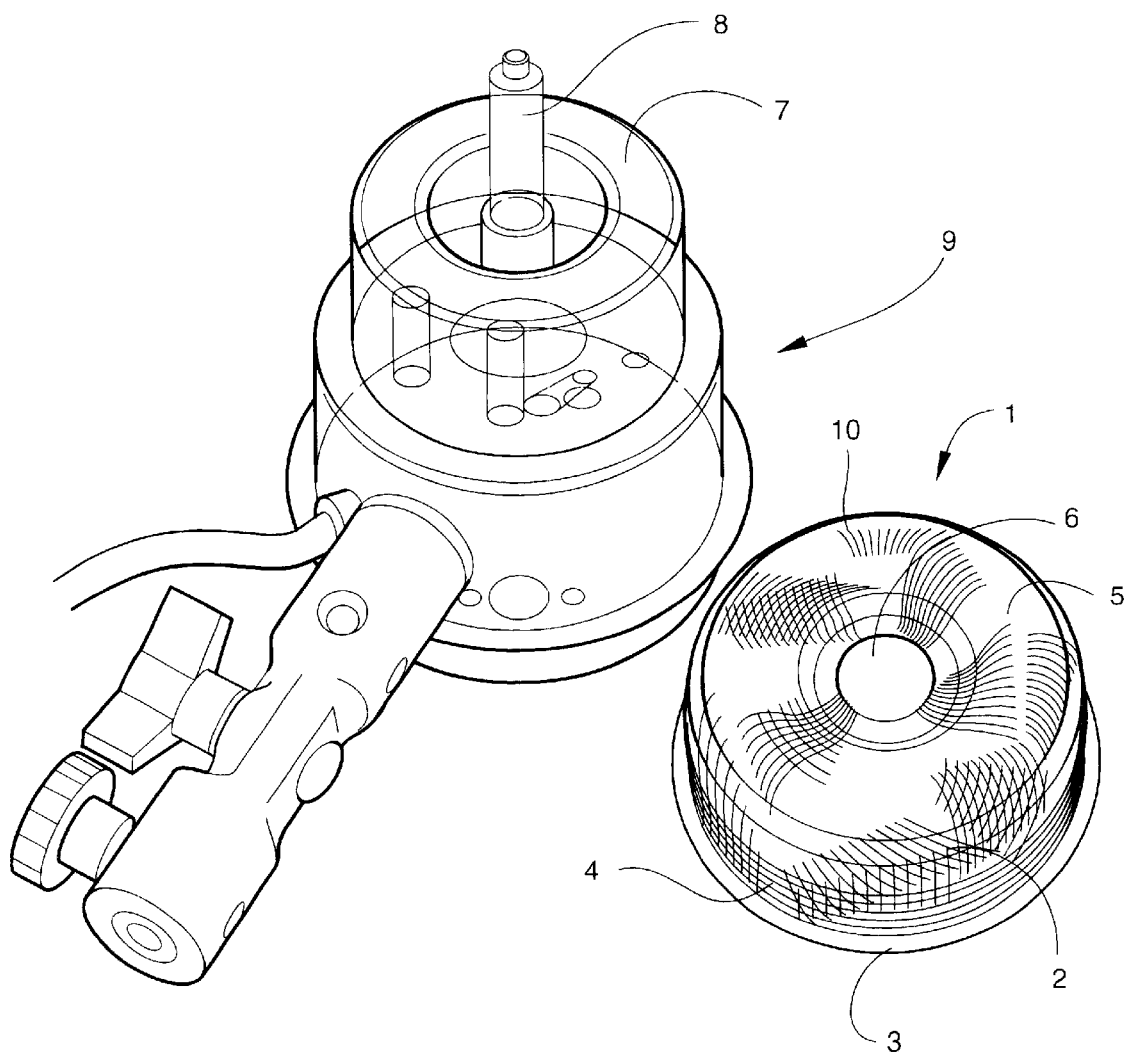
FIG. 1 is an illustration of the filter device according to the present invention alont with a typical photo strobe unit.

The present invention relates to a filter device 1 for reducing the light output of a flash tube 7, while leaving the light output of a modeling light tube 8 unaffected, in a dual lamp photo strobe unit 9. Therefore the present invention is useful for reducing the light output of a flash tube 7, while leaving the light output of a modeling light tube 8 unaffected, in a dual lamp photo strobe unit 9.

The present invention is a filter device 1 comprised of a body 2 that is sized to fit over a flash tube 7 in a dual light, photo strobe unit 9. Critically, the body 2 fits over the flash tube 7 only, thereby leaving the modeling light 8 unobstructed. It its preferred embodiment, the filter device 1 has axial symmetry. It a most preferred embodiment, the filter device 1 has a circularly shaped base 3, a tubular sidewall 4 that extends from the base to an enclosing top section 5. The top section 5 critically includes an aperture 6 through which the modeling light 8 will project, when the filter device 1 is placed upon a photo strobe unit 9.

The body 2 of the filter device 1 is necessarily made of a material that can absorb, or withstand, temperatures generated by close proximity to a flash unit 7, when the flash unit 7 is in use. Further, the body 2 of the filter device 1 must be able to block a portion of the light emitted by the flash tube 7, thereby reducing the amount of light provided by the flash tube external to the filter device 1. Accordingly, the most preferred material is a mesh-like material 10 wherein the solid portions of the mesh completely block the emitted light and the open portion allow some of the emitted light to be used external to the filter device 1. It is most preferred that the mesh-material 10 be made from a metallic mesh or weave.

Alternately, the solid portions of the mesh may absorb some or all of the impinging light, instead of physically blocking the light. When the solid portions of the mesh absorb a portion of the impinging light, a portion may be transmitted, thereby allowing its use external to the filter device 1. When a portion of the emitted light is transmitted through the solid portion of the mesh, the open portion of the mesh may be decreased in size from that required if the solid portion physically blocked, or completely absorbed, the impinging light. Further, combinations of blocking and absorbing are considered to fall within the scope of the present invention.

Figure 3:
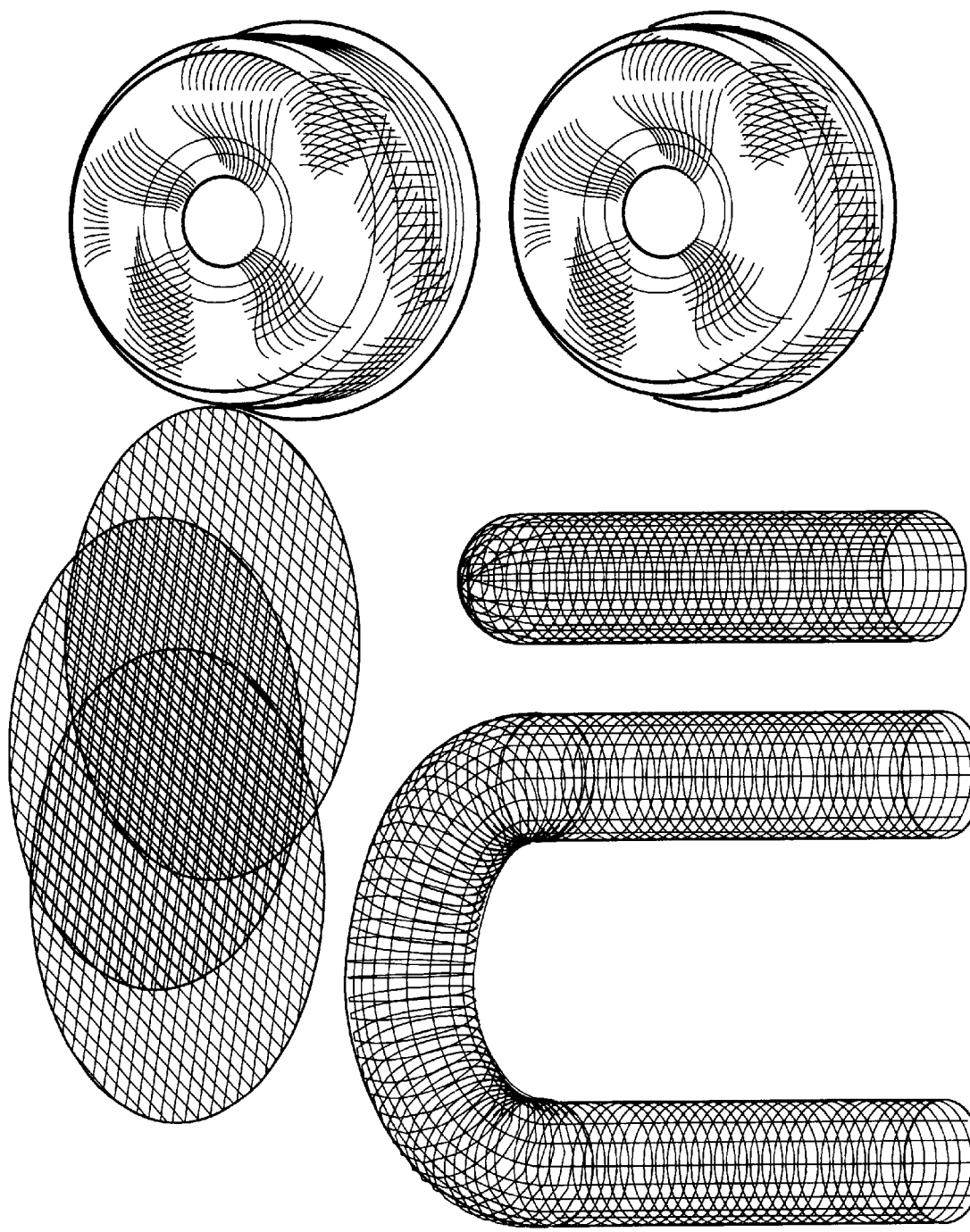
FIG. 3 illustrates a variety of alternate shapes for the filter device according to the present invention.

Other shapes that block the output of the flash tube 7 while leaving the output of the modeling tube 8 unaffected are considered to fall within the scope of the present invention. Example shapes are illustrated in FIG. 3. Such different shapes may include a flat screen, a "tubular" sock, or a U-shaped sock.

Figure 2:
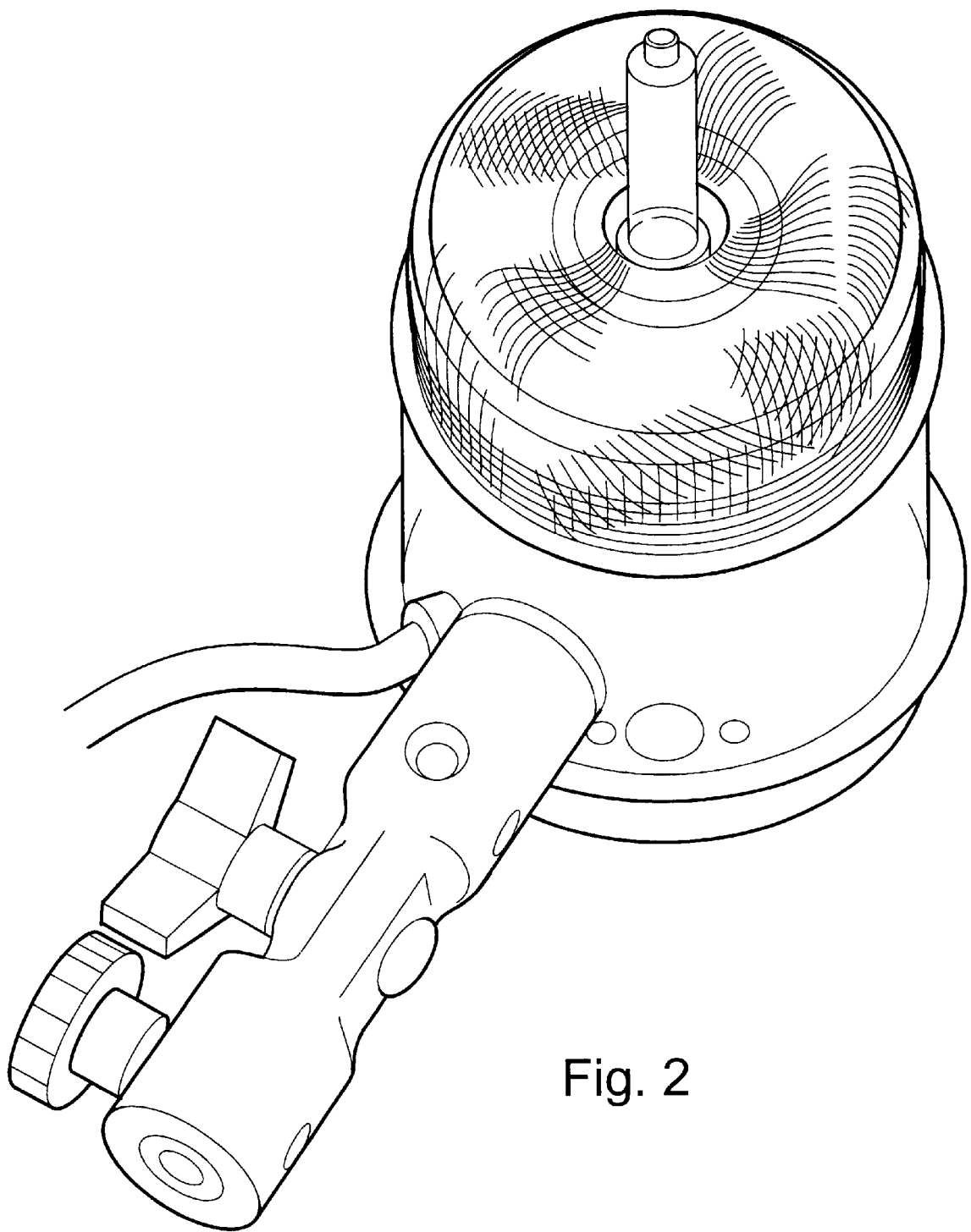
FIG. 2 illustrates the filter device according to the present invention, as it is used on a photo strobe unit.

In use, the filter device 1 according to the present invention is physically secured over the flash tube 7 of a dual light element photo strobe unit 9, as illustrated in FIG. 2. The modeling light element 8 will project through the aperture 6 in the top 5, thereby allowing the light output from the modeling light 8 to be unaffected. Preferably, the filter device 1 according to the present invention is sized to frictionally fit and secure to the photo strobe unit 9.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A light filter device comprising a light filter body that is sized to fit over a dual light system, wherein said light filter body fits over only a flash tube leaving a modeling light unobstructed.

2. The light filter device according to claim 1 wherein the light filter body has axial symmetry.

3. The light filter device according to claim 2 where in the axially symmetric light filter body is comprised of a circularly shaped base a tubular sidewall that extends from the base to an enclosing top section having an aperture through which the modeling light will project when the filter device is placed upon a photo strobe unit.

4. The light filter device according to claim 3 wherein the light filter body is made of a mesh-like material.

5. The light filter device according to claim 4 wherein solid portions of the mesh-like material is opaque to light.

6. The light filter device according to claim 5 wherein the mesh-like material is a metallic material.

7. The light filter device according to claim 4 wherein solid portions of the mesh-like material are partially transparent to light.

* * * * *